United States Patent
Jo

(10) Patent No.: US 11,772,575 B2
(45) Date of Patent: Oct. 3, 2023

(54) IN-VEHICLE CAMERA DEVICE AND VEHICLE

(71) Applicant: SUBARU CORPORATION, Tokyo (JP)

(72) Inventor: Keirai Jo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 73 days.

(21) Appl. No.: 17/315,915

(22) Filed: May 10, 2021

(65) Prior Publication Data

US 2021/0370846 A1 Dec. 2, 2021

(30) Foreign Application Priority Data

Jun. 2, 2020 (JP) ................................ 2020-096376

(51) Int. Cl.
*B60R 11/04* (2006.01)
*H05B 3/84* (2006.01)
*B60R 11/00* (2006.01)

(52) U.S. Cl.
CPC ............... *B60R 11/04* (2013.01); *H05B 3/84* (2013.01); *B60R 2011/0026* (2013.01)

(58) Field of Classification Search
CPC .... B60R 11/04; B60R 2011/0026; H05B 3/84
USPC ....................................................... 348/148
See application file for complete search history.

(56) References Cited

U.S. PATENT DOCUMENTS

| | | | |
|---|---|---|---|
| 2012/0034857 A1* | 2/2012 | Blake, III | B60H 1/00785 454/75 |
| 2016/0091714 A1* | 3/2016 | Hui | B60R 1/002 359/512 |
| 2016/0119509 A1* | 4/2016 | Wato | G03B 17/55 348/148 |
| 2017/0240138 A1* | 8/2017 | Mori | H04N 7/183 |
| 2017/0334366 A1* | 11/2017 | Sliwa | B60S 1/02 |
| 2018/0229690 A1* | 8/2018 | Adachi | B60S 1/023 |
| 2019/0202373 A1* | 7/2019 | Kubota | H04N 13/246 |
| 2020/0275533 A1* | 8/2020 | Ochiai | H05B 3/286 |
| 2021/0136269 A1* | 5/2021 | Katayama | H05B 3/84 |

FOREIGN PATENT DOCUMENTS

| | | | | |
|---|---|---|---|---|
| JP | 2014101004 A | * | 6/2014 | .............. B60S 1/026 |
| JP | 2020-053950 A | | 4/2020 | |
| WO | WO-2018230358 A1 | * | 12/2018 | .............. B60S 1/026 |

* cited by examiner

*Primary Examiner* — Kathleen M Walsh

(74) *Attorney, Agent, or Firm* — MCGINN I.P. LAW GROUP, PLLC

(57) ABSTRACT

An in-vehicle camera device is configured to be attached to the inside of a vehicle including a windshield. The in-vehicle camera device includes a camera, a housing, and a defogging sensor. The camera is configured to acquire an image of an area ahead of the vehicle through the windshield. The housing houses the camera and is to be disposed on an upper portion of the windshield. The defogging sensor is disposed below the field of view of the camera in the housing and is configured to detect fogging of the windshield.

17 Claims, 5 Drawing Sheets

IN-VEHICLE CAMERA DEVICE AND VEHICLE

CROSS-REFERENCE TO RELATED APPLICATIONS

The present application claims priority from Japanese Patent Application No. 2020-096376 filed on Jun. 2, 2020, the entire contents of which are hereby incorporated by reference.

BACKGROUND

The disclosure relates to an in-vehicle camera device.

In-vehicle cameras are disposed, for example, to acquire images to be used in a system configured to assist safe driving of a vehicle or to record images of the inside and the outside of a vehicle for security. An in-vehicle camera configured to acquire images of an area ahead of a vehicle is typically disposed on the side of a windshield closer to the inside of the vehicle and acquires images through the windshield (see Japanese Unexamined Patent Application Publication No. 2020-53950).

SUMMARY

An aspect of the disclosure provides an in-vehicle camera device. The in-vehicle camera device is configured to be attached to the inside of a vehicle including a windshield. The in-vehicle camera device includes a camera, a housing, and a defogging sensor. The camera is configured to acquire an image of an area ahead of the vehicle through the windshield. The housing houses the camera and is to be disposed on an upper portion of the windshield. The defogging sensor is disposed below the field of view of the camera in the housing and is configured to detect fogging of the windshield.

An aspect of the disclosure provides a vehicle including the above-mentioned in-vehicle camera.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
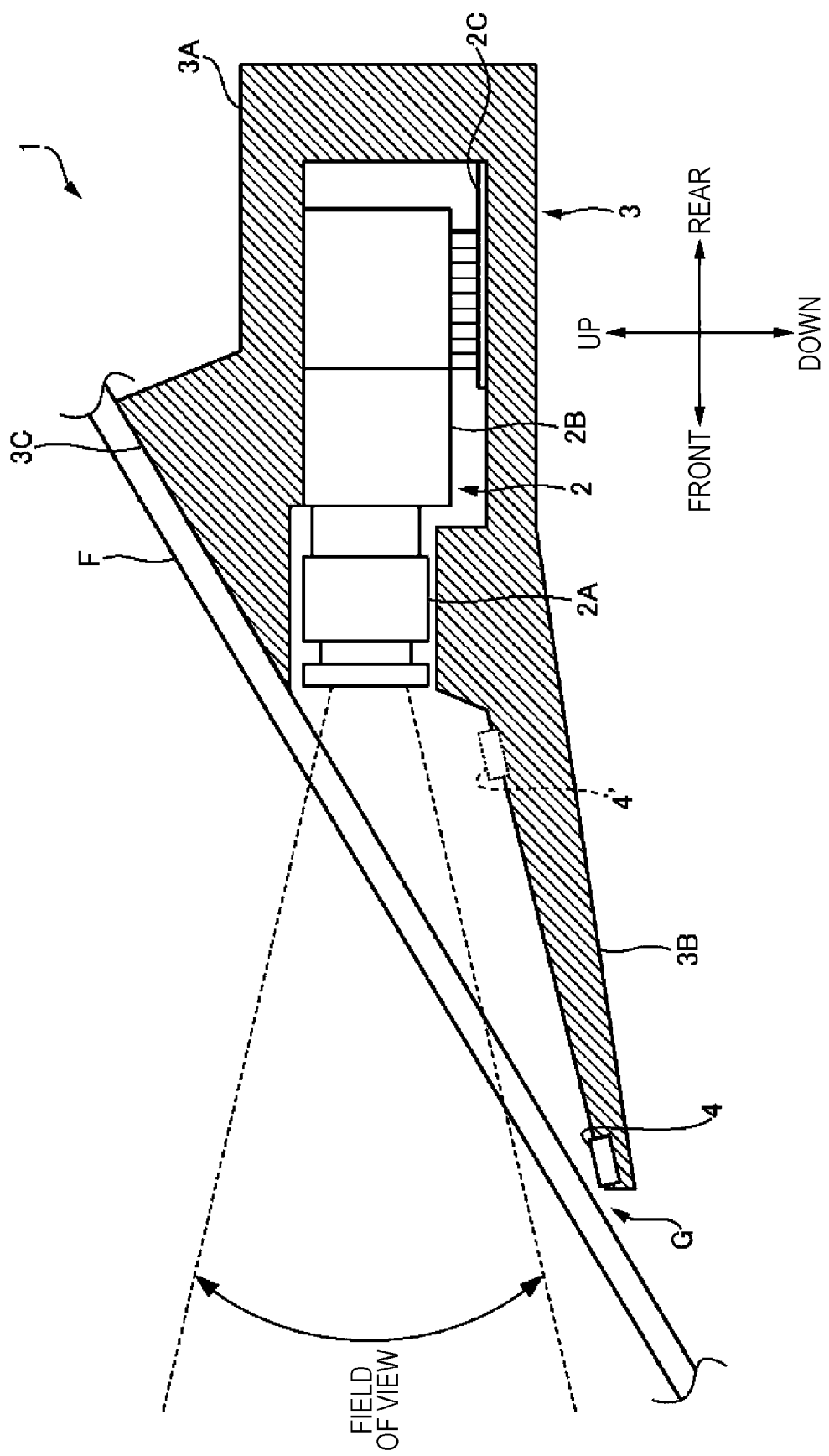
FIG. 1 is a diagram illustrating a configuration example of an in-vehicle camera device.

When an in-vehicle camera is disposed on the side of a windshield closer to the inside of a vehicle, a lens of the in-vehicle camera is close to the windshield, and a light-shielding hood is disposed below the field of view of the in-vehicle camera. This configuration enables a suppression of reflections caused by the light reflected to the inside of the vehicle by the windshield entering the in-vehicle camera. However, when fogging occurs on the portion of the windshield positioned within the field of view of the in-vehicle camera, it is difficult to remove the fogging manually in an easy operation due to the light-shielding hood acting as an obstacle. In an in-vehicle camera for driving assistance or for security, it is desirable to avoid, as much as possible, situations in which fogging of the portion of a windshield within the field of view thereof obstructs image acquisition. Thus, it is desirable to rapidly remove the fogging of the windshield by automatically operating a defogger.

In such a case, it is difficult to accurately detect the fogging of the portion of the windshield positioned within the field of view of the in-vehicle camera. Even if a temperature and humidity sensor is simply disposed in the vicinity of the in-vehicle camera, it may not be possible to effectively detect the temperature and the humidity in a space covered with, for example, a hood or to accurately detect fogging of the portion of the windshield positioned within the field of view of the in-vehicle camera. When a temperature and humidity sensor is disposed inside the hood, the windshield sometimes reflects an image of the temperature and humidity sensor into the in-vehicle camera, and accordingly it is desirable to take measures to avoid such a phenomenon.

It is desirable to provide an in-vehicle camera device in which an in-vehicle camera is disposed on the side of a windshield closer to the inside of a vehicle and that is capable of, for example, accurately detecting fogging of the portion of the windshield positioned within the field of view of the in-vehicle camera.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

As illustrated in FIG. 1, an in-vehicle camera device 1 is attached to the inside of a vehicle including a windshield F. The in-vehicle camera device 1 includes a camera 2, which is configured to acquire images of an area ahead of the vehicle through the windshield F, and a housing 3, which houses the camera 2 and is disposed on an upper portion of the windshield F.

The housing 3 may be attached directly to the upper portion of the windshield F or may be attached to a support member fixed to an upper portion of the windshield F. Alternatively, the housing 3 may be attached to, for example, an inner wall of the vehicle above the windshield F. When a pair of cameras 2 are housed in the housing 3, the cameras 2 may be disposed in a similar manner, for example, in a left-right direction or an up-down direction, or so as to face opposite directions.

The camera 2 includes a lens barrel 2A and a body 2B. A lens system is disposed in the lens barrel 2A. A camera board on which an image sensor is mounted, an image processor, and other components are disposed in the body 2B. An external coupling circuit 2C is coupled to the body 2B.

The housing 3 can be formed by a single-piece structure or a structure in which a plurality of components are joined, and each component to be described below may be a part of a single-piece structure or a separate component.

The housing 3 includes a camera housing 3A, a hood 3B, and a mounting member 3C. The hood 3B is disposed below the field of view of the camera 2 so as to extend forward from the camera housing 3A. The mounting member 3C is a component with which the housing 3 is attached to an inner surface of the windshield F, the vicinity of the windshield F (for example, a front end of a roof trim), or other places.

A defogging sensor 4 (4') is disposed in the housing 3. The defogging sensor 4 (4') is disposed below the field of view of the camera 2 in the housing 3. In the example illustrated in FIG. 1, the defogging sensor 4 is disposed at a front end of the hood 3B. The defogging sensor 4 (4') detects fogging of the windshield F. The defogging sensor 4 (4') is, for example, a temperature and humidity sensor.

The defogging sensor 4 (4'), which is disposed below the field of view of the camera 2 in the housing 3, directly detects the temperature and the humidity in the space between the housing 3 (hood 3B) and the windshield F. Thus, such an in-vehicle camera device 1 is capable of accurately detecting fogging of the portion of the windshield F within the field of view of the camera 2.

In this case, as illustrated in FIG. 1, the defogging sensor 4 (4') can be disposed at appropriate positions in the housing 3. For example, as illustrated in FIG. 1, disposing the defogging sensor 4 at the front end of the hood 3B enables the defogging sensor 4 to directly detect the temperature and the humidity of the air flowing upward toward the camera 2, which is a heat source, through an opening G between the front end of the housing 3 (hood 3B) and the windshield F. In addition, disposing the defogging sensor 4' at a position close to the camera 2 in the hood 3B enables reflection of an image of the defogging sensor 4' in the camera 2 to be avoided.

Figure 2:
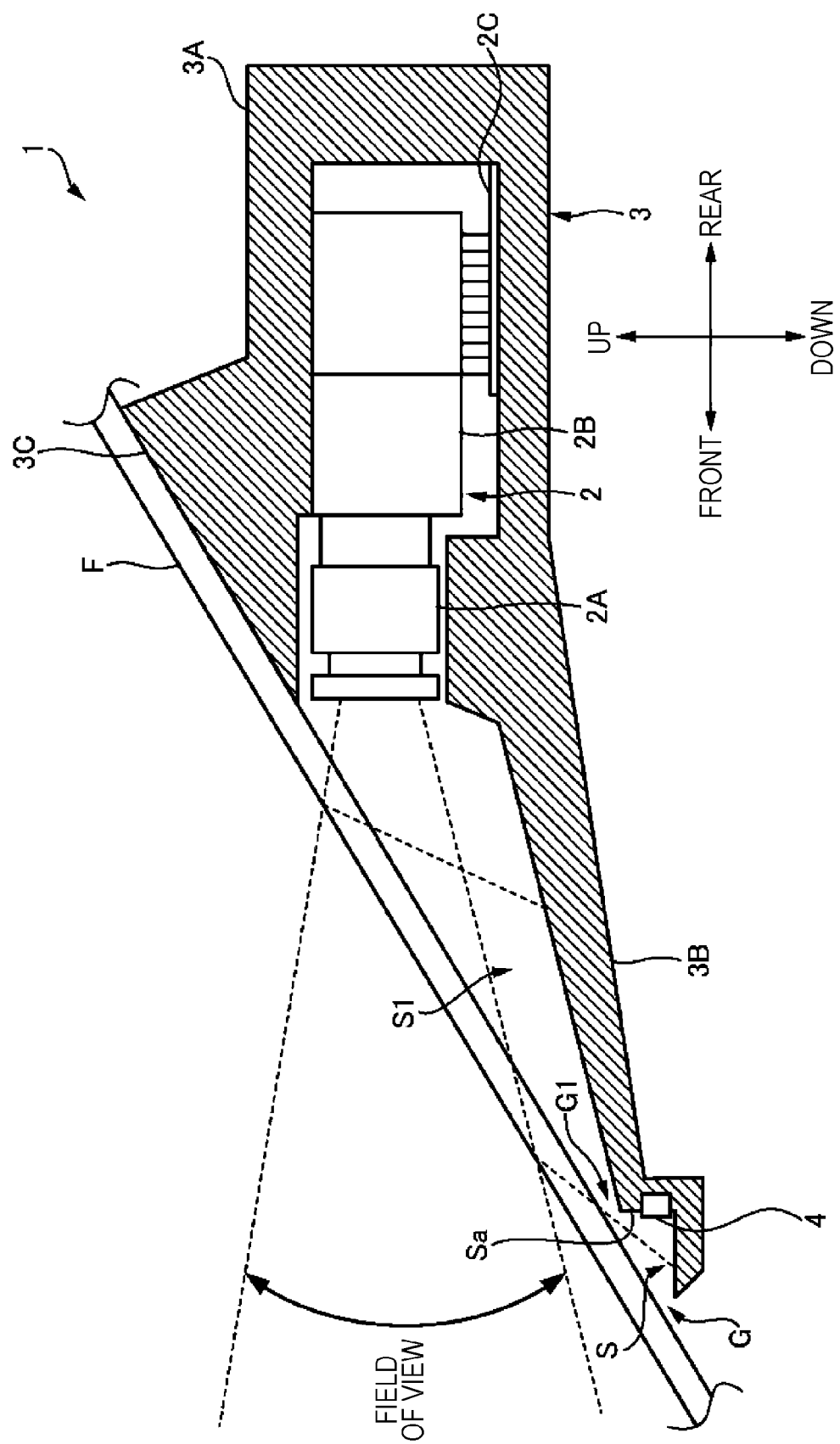
FIG. 2 is a diagram illustrating another configuration example of the in-vehicle camera device.

FIG. 2 illustrates another configuration example of the in-vehicle camera device 1. In this example, the housing 3 has a space S, which is in communication with the opening G between the windshield F and the front end of the housing 3 close to the windshield F. The defogging sensor 4 is disposed in the space S.

For example, the space S, which is recessed so as to form a compartment, is disposed at the front end of the hood 3B of the housing 3. Three sides of the space S, which is formed into a compartment, are closed. An area closer to the opening G in the space S and an upper area continuous with the opening G in the space S are open. As described above, the space S is in communication with the opening G. In addition, the space S is in communication with a space S1, which is above the hood 3B and contains the portion of the windshield F within the field of view of the camera 2.

At an opening G1, through which the space S and the space S1 are in communication with each other, an air passage is partly narrowed. In the example illustrated in FIG. 2, the space S is defined by a longitudinal wall Sa, which is disposed at a position closer than the opening G to the camera 2 in the direction of the length of the vehicle. The defogging sensor 4 is disposed in the longitudinal wall Sa. The expression "a position closer to the camera 2 in the direction of the length of the vehicle" denotes a position closer to the position where the camera 2 is disposed in the direction of the length (for example, a front-rear direction) of the vehicle in which the in-vehicle camera device 1 is disposed.

Figure 3:
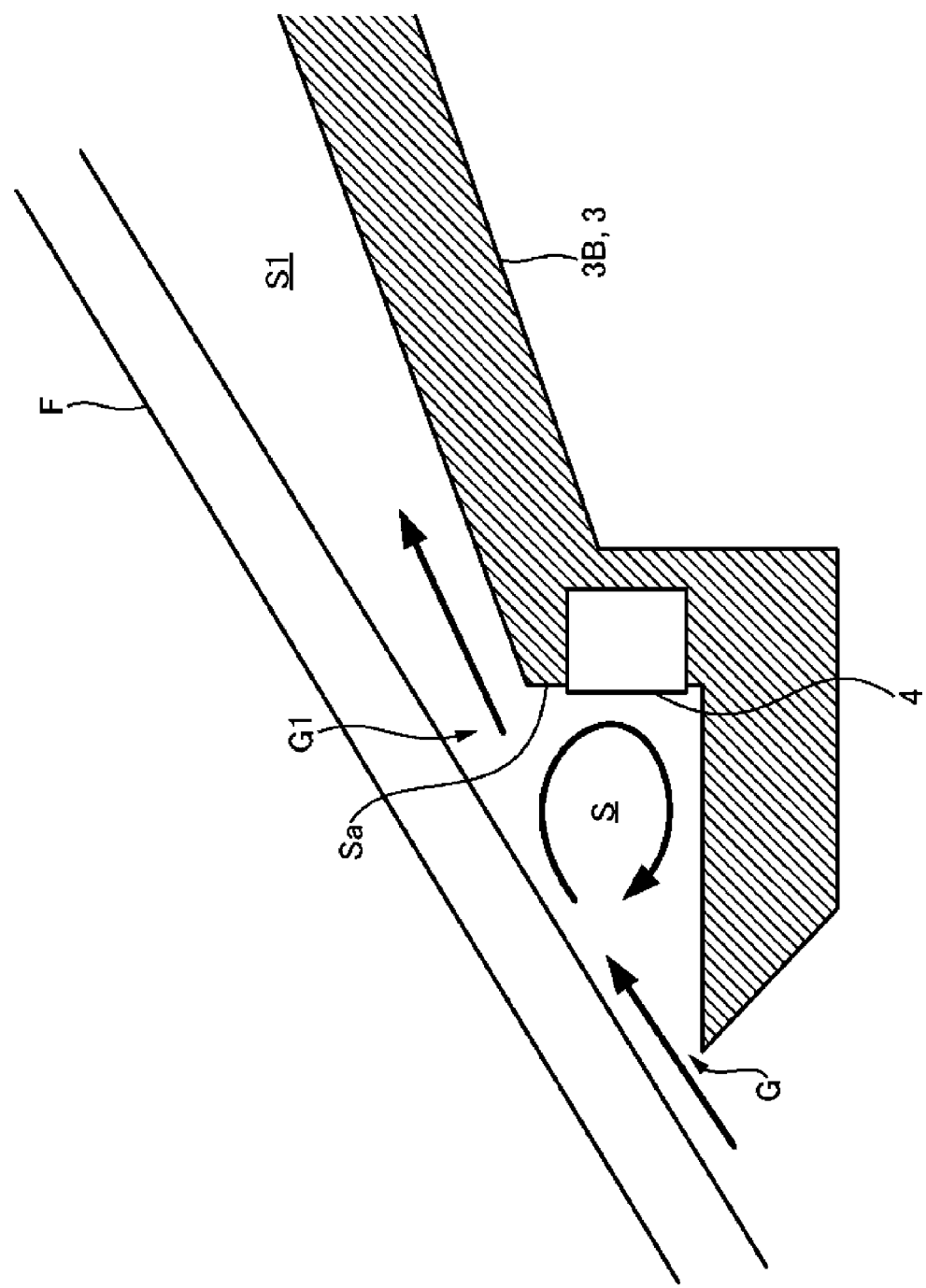
FIG. 3 is an enlarged diagram of a space.

FIG. 3 is an enlarged view of the space S in FIG. 2. Arrows in FIG. 3 represent an image of airflow in the space S. Air in the vehicle flows upward toward the camera 2, which is a heat source, through the opening G. That is, the air enters the space S through the opening G and then enters the space S1 from the space S through the opening G1.

The air entering the space S through the opening G forms an air eddy (or a stagnant pool of air) due to the space S, which is formed as described above. The defogging sensor 4 disposed in the longitudinal wall Sa detects the temperature and the humidity of the air temporarily remaining in the space S and is thus capable of responsively detecting changes in the temperature and the humidity of the air.

The longitudinal wall Sa in the space S is in the shade that the light entering the field of view of the camera 2 by being reflected by the inside of the hood 3B and the windshield F does not reach. Thus, disposing the defogging sensor 4 in the longitudinal wall Sa enables reflection of an image of the defogging sensor 4 in the camera 2 to be avoided.

Figure 4:
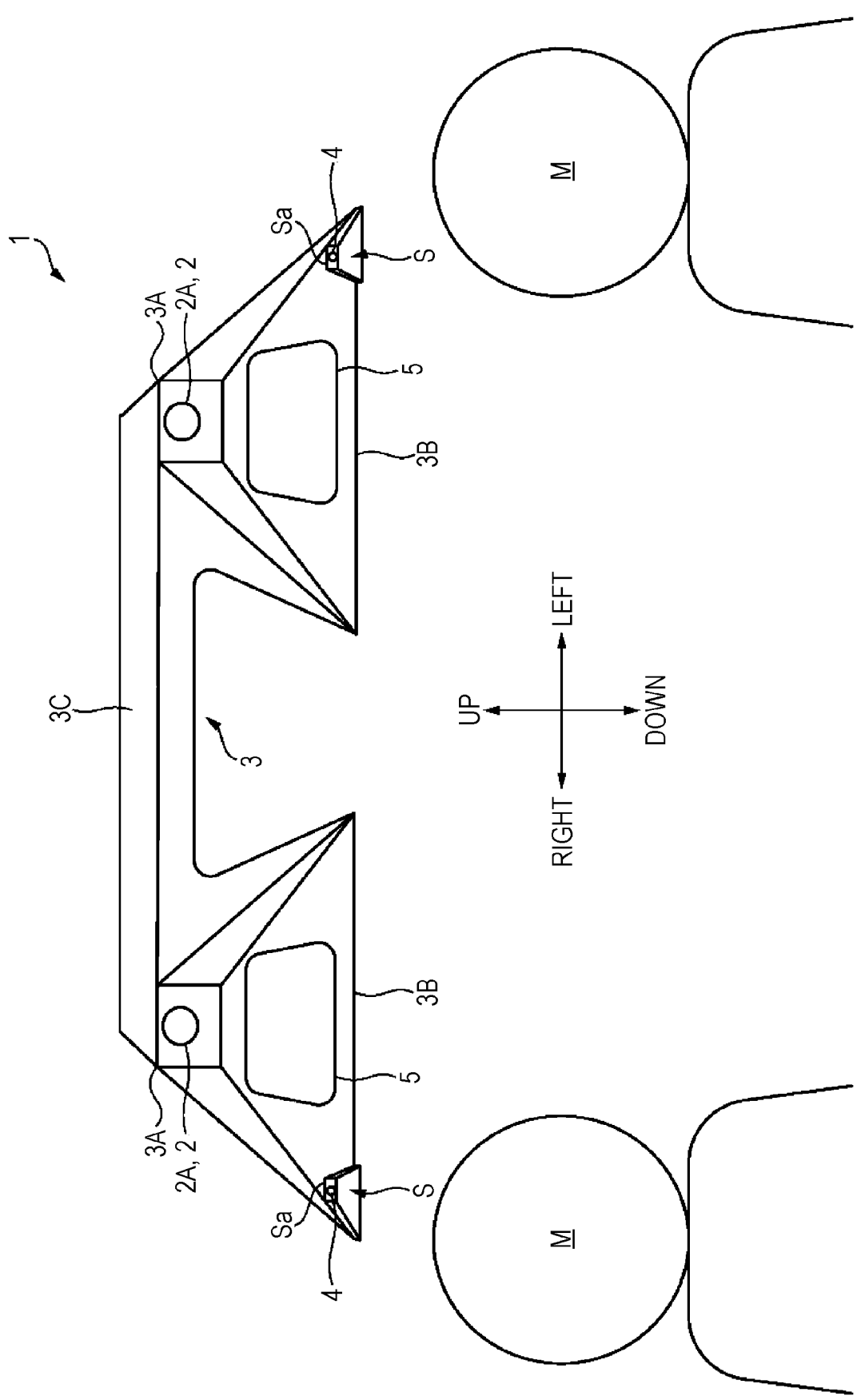
FIG. 4 is a front view of the in-vehicle camera device (a diagram illustrating the positional relationship between the in-vehicle camera device and occupants)

As illustrated in FIG. 4, the in-vehicle camera device 1 is capable of holding a pair of cameras 2 with the housing 3 and is capable of forming, for example, a stereo camera. In such an in-vehicle camera device 1 in some embodiments, the defogging sensor 4 is disposed at a position as close to an occupant M as possible. Moisture and heat emitted by an occupant M may cause fogging of the windshield F. Thus, it is possible to improve the reliability of an image acquired through the windshield F by rapidly detecting such moisture or heat and by operating a defogger.

A pair of hoods 3B of the housing 3 are disposed, in the left-right direction, in the in-vehicle camera device 1 illustrated in FIG. 4. Camera housings 3A are disposed behind the respective hoods 3B. In the hood 3B on the right when viewed in the direction from the rear toward the front of a vehicle, the space S is disposed at the right front end thereof. In the hood 3B on the left when viewed in the direction from the rear toward the front of the vehicle, the space S is disposed at the left front end thereof. The defogging sensor 4 is disposed in each space S. Such a disposition of the defogging sensor 4 enables effective detection of moisture and heat emitted by an occupant M.

A signal detected by the defogging sensor 4 is transmitted to a controller included in the in-vehicle camera device 1 or a controller (for example, an ECU) of the vehicle. When fogging is detected in operations of a controller, a defogger configured to remove the fogging of the windshield F begins to operate. The defogger is, as illustrated in FIG. 4, a heater (heater patch) 5, which is disposed on each hood 3B of the housing 3, or a defroster (for example, defrosting air or a heating wire heater of the windshield F) of the vehicle.

Figure 5:
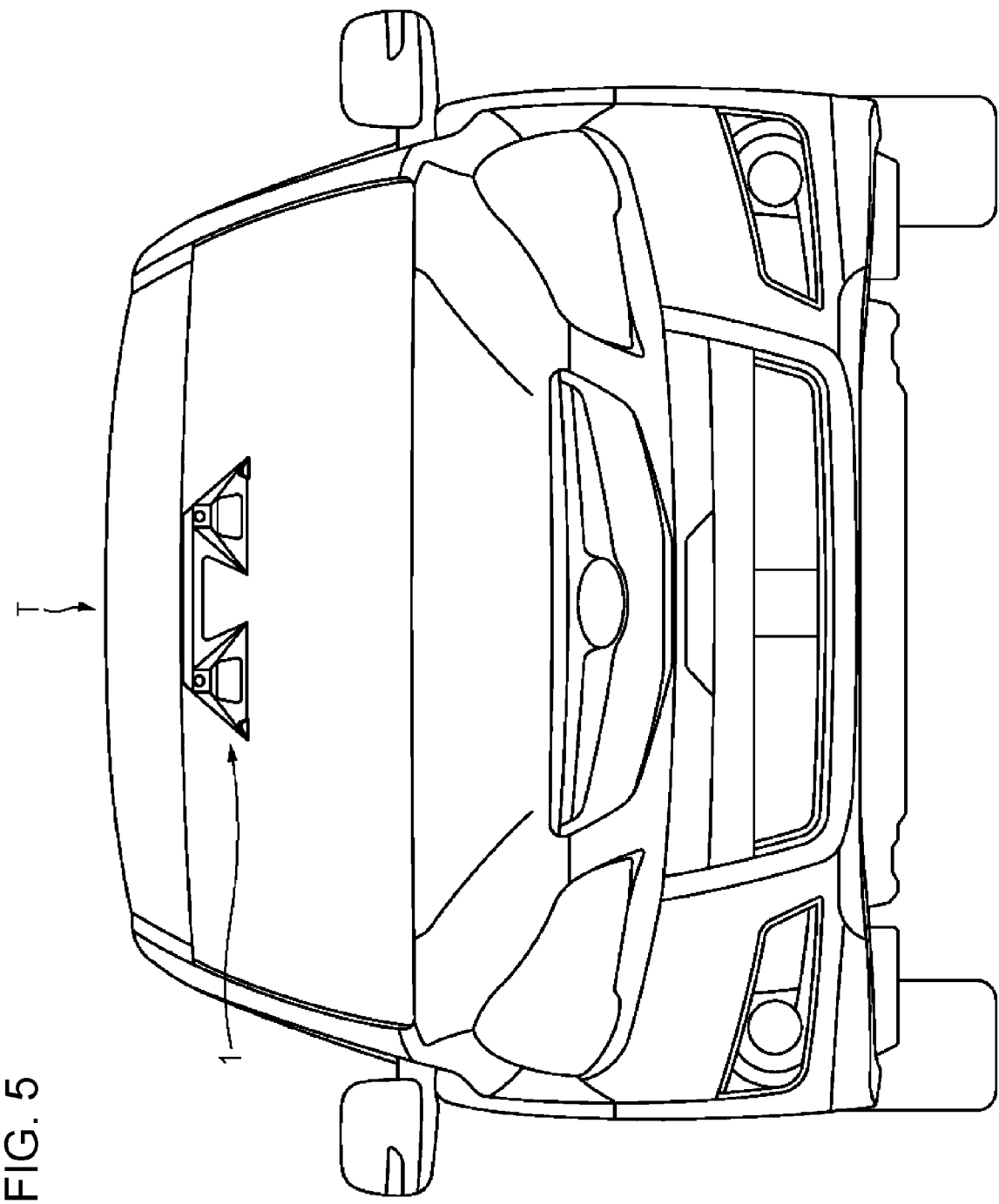
FIG. 5 is a diagram illustrating a vehicle including the in-vehicle camera device.

As illustrated in FIG. 5, a vehicle T, which includes the in-vehicle camera device 1, is capable of effectively reducing fogging of the portion of the windshield F within the field of view of each camera 2. As a result, it is possible to acquire clear images of an area ahead of the vehicle T and to thus properly control driving assistance for the vehicle T, for example.

Embodiments of the disclosure have been described above in detail with reference to the drawings. The specific configuration is not limited to that in each embodiment. For example, design modifications are encompassed in the disclosure without departing from the gist of the disclosure. The above embodiments can be combined by appropriately using each technique therein without contradictions and problems in, for example, the objects or the configurations thereof.

The invention claimed is:

1. An in-vehicle camera device configured to be attached to an inside of a vehicle comprising a windshield, the in-vehicle camera device comprising:
   a camera configured to acquire an image of an area ahead of the vehicle through the windshield;
   a housing that houses the camera and that is to be disposed on an upper portion of the windshield; and
   a defogging sensor disposed below a field of view of the camera in the housing such that a distal end of the housing is positioned between the defogging sensor and the windshield, the defogging sensor being configured to detect fogging of the windshield,
   wherein the housing has a space in communication with an opening between the windshield and a front end of the housing when the in-vehicle camera device is attached to the inside of the vehicle, and
   wherein the defogging sensor is disposed in the space.

2. The in-vehicle camera device according to claim 1, wherein
   the space is defined by a longitudinal wall disposed at a position closer to the camera in a direction of a length of the vehicle than the opening, and
   the defogging sensor is disposed in the longitudinal wall.

3. The in-vehicle camera device according to claim 1, wherein a heater configured to operate in accordance with a signal detected by the defogging sensor is disposed in the housing.

4. The in-vehicle camera device according to claim 2, wherein a heater configured to operate in accordance with a signal detected by the defogging sensor is disposed in the housing.

5. A vehicle comprising the in-vehicle camera device according to claim 1.

6. The in-vehicle camera device according to claim 1, wherein the housing extends closer to the windshield than a position of the defogging sensor.

7. The in-vehicle camera device according to claim 1, wherein the distal end of the housing is separated from the windshield, thereby forming an opening between the housing and the windshield.

8. The in-vehicle camera device according to claim 1, wherein the housing includes a hood that extends towards the windshield from the camera parallel to the field of view.

9. The in-vehicle camera device according to claim 1, wherein the defogging sensor is disposed nearer to the camera than the distal end of the housing.

10. The in-vehicle camera device according to claim 1, wherein the defogging sensor is separated from the windshield.

11. The in-vehicle camera device according to claim 1, wherein the defogging sensor is in a non-contact state with the windshield.

12. The in-vehicle camera device according to claim 7, wherein the defogging sensor detects a temperature and a humidity of air flowing upward toward the camera through the opening between the housing and the windshield.

13. The in-vehicle camera device according to claim 8, wherein the defogging sensor is disposed on the hood.

14. An in-vehicle camera device configured to be attached to an inside of a vehicle comprising a windshield, the in-vehicle camera device comprising:
   a camera configured to acquire an image of an area ahead of the vehicle through the windshield and a first space, the first space being located between the camera and the windshield;
   a hood disposed below the first space and configured to define a lower edge of the first space; and
   a sensor disposed on a front portion of the hood and separated from the windshield, the front portion being located rearward of a front end of the hood,
   wherein the front end of the hood is separated from the windshield, thereby forming an opening between the hood and the windshield,
   wherein the first space communicates with the opening,
   wherein the sensor detects a temperature and a humidity of air flowing upward toward the first space through the opening,
   wherein the front portion of the hood defines a second space between the front portion of the hood and the windshield,
   wherein the second space is located between the first space and the opening and communicates with the first space and the opening, and
   wherein the sensor is disposed to face the second space.

15. The in-vehicle camera device according to claim 14, wherein the hood includes a narrowing portion that narrows an air passage between the first space and the second space, and
   wherein the air passage is a gap between the windshield and the narrowing portion.

16. The in-vehicle camera device according to claim 15, wherein a maximum vertical width of the second space is broader than a vertical width of the opening, and
   wherein a vertical width of the gap is narrower than the maximum vertical width of the second space.

17. The in-vehicle camera device according to claim 16, wherein the front portion of the hood includes a longitudinal wall that faces forward and defines a rear end of the second space, and
   wherein the sensor is disposed in the longitudinal wall.

* * * * *